US011797325B2

(12) United States Patent
Eyberg et al.

(10) Patent No.: US 11,797,325 B2
(45) Date of Patent: Oct. 24, 2023

(54) RUNNING ARBITRARY BINARIES AS UNIKERNELS ON EMBEDDED PROCESSORS

(71) Applicant: NanoVMs, Inc., San Francisco, CA (US)

(72) Inventors: Ian Eyberg, Oakland, CA (US); William Yongwoo Jhun, Tuckahoe, NY (US)

(73) Assignee: NanoVMs, Inc., San Francisco, CA (US)

( * ) Notice: Subject to any disclaimer, the term of this patent is extended or adjusted under 35 U.S.C. 154(b) by 0 days.

(21) Appl. No.: 17/696,716

(22) Filed: Mar. 16, 2022

(65) Prior Publication Data
US 2022/0206830 A1    Jun. 30, 2022

Related U.S. Application Data

(63) Continuation of application No. 15/931,479, filed on May 13, 2020, now Pat. No. 11,321,107.

(51) Int. Cl.
*G06F 9/455* (2018.01)
*G06F 8/61* (2018.01)
*G06F 13/42* (2006.01)

(52) U.S. Cl.
CPC ............ *G06F 9/45545* (2013.01); *G06F 8/63* (2013.01); *G06F 9/45558* (2013.01); *G06F 13/4282* (2013.01); *G06F 2009/45579* (2013.01)

(58) Field of Classification Search
CPC .... G06F 9/45545; G06F 8/63; G06F 9/45558; G06F 2009/45579
See application file for complete search history.

(56) References Cited

U.S. PATENT DOCUMENTS

| | | | |
|---|---|---|---|
| 2017/0155724 A1* | 6/2017 | Haddad | H04L 61/503 |
| 2017/0364377 A1* | 12/2017 | Koller Jemio | G06F 8/54 |
| 2018/0046446 A1* | 2/2018 | Turovsky | G06F 9/455 |
| 2018/0165110 A1* | 6/2018 | Htay | G06F 8/65 |
| 2018/0375897 A1* | 12/2018 | Kawasaki | H04L 63/1433 |
| 2020/0183726 A1* | 6/2020 | Heindl | H04L 63/102 |
| 2020/0264941 A1* | 8/2020 | Drepper | G06F 9/545 |
| 2020/0410318 A1* | 12/2020 | del Mundo | G06F 17/15 |
| 2022/0201044 A1* | 6/2022 | Willis | H04L 63/10 |

OTHER PUBLICATIONS

AArch64 Options—Using the GNU Compiler Collection (GCC). 3.18.1 AArch64 Options. https://gcc.gnu.org/onlinedocs/gcc-6.1.0/gcc/AArch64-Options.html. Apr. 27, 2016.
(Continued)

*Primary Examiner* — Dong U Kim
(74) *Attorney, Agent, or Firm* — Van Pelt, Yi & James LLP (57) ABSTRACT

Orchestration of guest unikernel virtual machines on a host device includes determining hardware profile information associated with the host device. It further includes based at least in part on the determined hardware profile information, configuring orchestration of the guest unikernel virtual machines to be provisioned by a hypervisor running on the host device.

11 Claims, 5 Drawing Sheets

(56) References Cited

OTHER PUBLICATIONS

ARM Cortex—A Series Programmer's Guide for ARMv8-A. 14.1.5 Asymmetric multi-processing. https//developer.arm.com/docs/den0024/a/multi-core-processors/multi-processing-systems/asymmetric-multi-processing. Mar. 24, 2015.

ARM Cortex—A Series Programmer's Guide for ARMv8-A. Chapter 16.big.LittleTechnology. https://developer.arm.com/docs/den0024/a/biglittle-technology. Mar. 24, 2015.

Jia He, Arm. When Unikraft Meets Arm64. Jul. 2019 Xen summit 2019 Chicago, https://www.slideshare.net/xen_com_mgr/xppds19-when-unikraft-meets-arm64-jia-he-arm.

Kaly Xin. XPDDS18: Unikraft: An Easy Way of Crafting Unikernels on Arm. Published Jul. 3, 2018. https://www.slideshare.net/xen_com_mgr/xpdds18-unikraft-an-easy-way-of-crafting-unikernels-on-arm-kaly-xin-arm.

Pierre Olivier, Hexo: Offloading HPC Compute-Intensive Workloads on Low-Cost, Low-Power Embedded Systems, Jun. 22, 2019, ACM (Year: 2019).

Wei Chen. 64-bitARM Unikernels on uKVM. Open Source Summit North America. Sep. 11, 2017. https://static.sched.com/hosted_files/ossna2017/a9/64-bit%20ARM%20Unikernels%20on%20uKVM%20v10%20-%20OSSNA2017.pdf.

Wei Chen. 64-bitARM Unikernels on uKVM. Tokyo / Open Source Summit Japan 2017. May 31, 2017. https://events.static.linuxfound.org/sites/events/files/slides/64-bit%20ARM%20Unikernels%20on%20uKVM%20v6_0.pdf.

\* cited by examiner

RUNNING ARBITRARY BINARIES AS UNIKERNELS ON EMBEDDED PROCESSORS

CROSS REFERENCE TO OTHER APPLICATIONS

This application is a continuation of U.S. patent application Ser. No. 15/931,479, entitled RUNNING ARBITRARY BINARIES AS UNIKERNELS ON EMBEDDED PROCESSORS filed May 13, 2020 which is incorporated herein by reference for all purposes.

BACKGROUND OF THE INVENTION

Due to benefits such as security isolation, it would be advantageous to run unikernels in scenarios such as edge computing and Internet of Things (IoT) deployments. However, due to the complexity involved (e.g., service and application requirements, device variation, etc.), deploying unikernels in such environments can be challenging.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Due to their isolation primitives, unikernel virtual machines provide various security benefits. For example, because a unikernel is single process and does not have the capability to run multiple processes, it is difficult for another program to be loaded onto a unikernel. As another isolation primitive, unikernels do not have users. In unikernels, user-related system calls are typically stubbed out, non-existent, or otherwise not implemented. Further, as compared to a full operating system, such as Linux, unikernels have a much smaller code base (e.g., 40,000 lines for a unikernel virtual machine versus 28 million lines of code for Linux). This is due in part to unikernels including only those dependencies required by the single application to be run in the unikernel. Thus, the attack surface is much smaller for unikernels as compared to typical operating systems.

Such security benefits of unikernels would also be attractive in scenarios such as edge deployments and Internet of Things (IoTs) deployments. In many cases, the hardware devices used in these deployments include embedded processors or SoC (System on Chip) systems of varying architectures (e.g., RISC (Reduced Instruction Set Computing)-V, ARM (Advanced RISC Machine), x86, MIPS (Microprocessor without Interlocked Pipelined Stages), etc.). For example, ARM devices are popular in such deployments due to their low cost nature and wide spread availability. However, while ARM devices are common in such edge deployments, there are various challenges in deploying unikernels on ARM devices. One example challenge is due to the variation in the multitude of ARM devices available. For example, there are many revisions of the instruction set architecture, with differing capabilities (e.g., virtualization support, 32 bit versus 64 bit support), and even within a specific revision, there is a multitude of different types of devices that exist, each with a different amount of cores, cortex type, etc. Further, memory layout, privilege levels, FPU support, etc. may be considerably different for different ARM devices. Further, while virtualization on x86 systems is a well-defined area, this is not the case for ARM. Thus, the challenges in supporting unikernel guest virtual machines on embedded devices with widely varying architectural features can prevent applications from running well or even being able to boot to begin with.

Yet another challenge with deployment of unikernels on embedded devices is due to the extensibility that may be required to support the tasks, functions, or services requested in such edge deployments (e.g., compared to typical cloud workloads). For example, many edge deployments do not only involve remote host devices, but also hardware peripherals that are connected to the host device that are used to provide some needed functionality in facilitating some requested service, which often need the use of various external devices/peripherals attached to the host devices (e.g., sensors for taking measurements, etc.). Providing such support for peripherals and allowing unikernels to access such peripherals can be challenging. A further challenge is in the management of edge deployments, where the devices are often remote with limited accessibility.

Using the techniques described herein, which as will be described in further detail below, include techniques for configuring orchestration, unikernel guest virtual machines running unmodified binaries (versus, for example, unikernels with language-specific support that require rewriting of source code and cross-compilation) on embedded devices or SoC systems of varying architectures (e.g., ARM, RISC-V, x86, MIPS, etc.) can be deployed with improved performance. Further, extensibility support (e.g., access to various passthrough devices such as sensors, coprocessors, etc.) is able to be provided to the unikernel guest virtual machines running the unmodified binaries on such devices with embedded processors (e.g., for accessing passthrough devices attached to a host ARM device).

For example, using the techniques described herein, hardware profile information is used to optimize the configuration of hypervisor orchestration (which may include determining which orchestration flags to set and/or not set). This enables improvements to deployment of unikernel guest virtual machines, where the same application may run much faster with the optimized orchestration using the hardware profile information (as compared to not using the techniques described herein). In some cases, the techniques described herein allow an application to boot that otherwise would not have.

The techniques described herein include orchestration from the perspective of choosing application binaries so that they best match the hardware that they are running on (e.g., determining appropriate kernel support for the target host hardware), as well as orchestration from the perspective of deploying unikernel guest virtual machines on host devices, which may include static and dynamic configuration of hypervisors based on hardware profile information.

For example, using the techniques described herein, various aspects of processor architecture may be used to determine kernel build configuration and compilation flags. Examples of such aspects of processor architecture include the availability of hardware virtualization features. Another example aspect is the vast diversity of SoC types, utilizing a wide of variety of CPU core types themselves (and, being configurable soft cores, there may be many physical incantations of a particular soft core). For example, instructions for SIMD (Single Instruction, Multiple Data) and DSP (Digital Signal Processing) may be optional. Some compilers will generally make use of these instructions if available. Yet another example aspect of processor architectures that can affect the kernel build configuration and compilation flags is asymmetric multi-processing (AMP)/asymmetric multi cores, where some SoCs will contain multiple types of cores.

The orchestration techniques described herein for deploying unikernel guest virtual machines on embedded devices (or devices with embedded processors) with support for extensibility are in contrast to orchestration that would typically done for existing types of installations, such as bare metal Linux installations or with Linux guest virtual machines. For example, orchestration of hardware permissions and access when attaching external hardware devices to the host device is handled differently (e.g., through the administration unikernel guest virtual machine described in further detail below). In the example of bare metal Linux, currently, there are the traditional UNIX users and file permissions model, which are often routinely abused by end users in the name of expediency, such that a single local bug can lead to infiltration of an entire system. Another difference in the orchestration techniques described herein compared to those used for typical virtual machines running full guest operating systems is that because unikernels are single process, if multiple applications are to work in concert to provide the functionality requested by an end user (which is common in real world use cases), each application is run in a separate unikernel instance. Thus, deployment of a service relying on multiple applications will involve the management and orchestration of multiple virtual machines. In contrast, a single virtual machine running a full guest operating system may run with multiple applications, but without the security benefits of unikernels.

While example embodiments involving ARM devices are described below for illustrative purposes, the techniques described herein may be variously adapted to accommodate embedded devices with various architectural features (which may be specific to the SoC and CPU core(s) used) and hardware configurations (which may be specific to platform/deployment). As will be described below, with the increasing availability of virtualization features in embedded (e.g., ARM) hardware, improved orchestration and deployment of applications for embedded and control systems may be achieved using the techniques described herein.

Building a Unikernel to be Deployed on an ARM Device

The following is an example embodiment of building a unikernel disk image, which after being built, is then deployed on an ARM device. In this example, suppose that an end user would like to run a function or service on an ARM device using unikernel virtual machines (e.g., due to the security benefits described above). The requested function or service may involve the use of one or more applications. Described below are example techniques for converting unmodified application binaries into unikernels.

Figure 1:
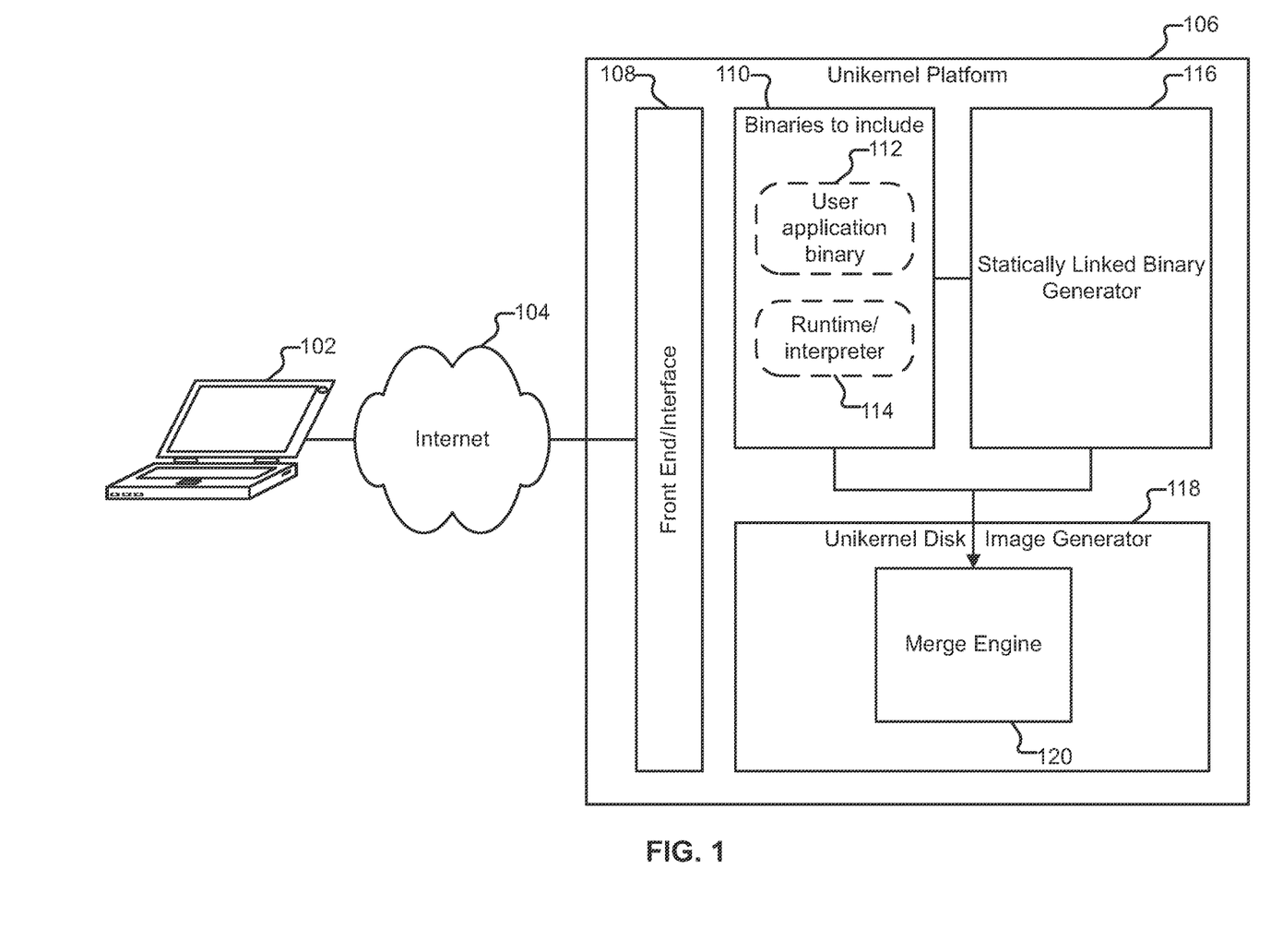
FIG. 1 illustrates an embodiment of an environment in which unikernels are built.

FIG. 1 illustrates an embodiment of an environment in which unikernels are built. In this example, unmodified binaries for the applications to be run by the end user are converted into unikernels.

In this example, platform 106 provides a build environment for building unikernel disk images. In this example, the end user, using device 102, accesses (e.g., over a network 104 such as the Internet) a configuration user interface (e.g., browser-based web interface) provided by front end 108 of platform 106. Via the user interface, the end user uploads or otherwise provides the application(s) 112 they wish to run in unikernel(s). The application(s) may be uploaded, for example, as a binary. The end user also specifies, via the provided interface, the type of workload they wish to run. In this example, the user indicates that they are interested in running an edge deployment on an ARM device (e.g., versus an x86 cloud workload). Via the configuration user interface, the end user also provides the binaries for the applications they wish to run. The end user also provides hardware profile information associated with the ARM device, such as any peripherals that the applications are to access.

In this example, the end user also specifies the hypervisor on which to deploy the unikernel VMs (virtual machines) to fulfill their objective or task or service. Examples of hypervisors include KVM, Xen, VirtualBox, etc. A user may select one based on, for example, passthrough support (e.g., due to the need for peripheral access, as described above). For example, compared to Xen, KVM has better built-in passthrough functionality, so that emulation is not needed to be performed (which may cause slowdowns that may be particularly sensitive to certain applications/task/services being implemented). For example, consider USB passthrough. While a USB device will still be running on a host, KVM provides a passthrough to access the USB device on the bus.

The bus management and the device management are performed on the host hardware (e.g., ARM device) that is running the KVM hypervisor.

Platform 106 is configured to use the hardware profile information and the received binaries to generate disk images for unikernel virtual machines. In this example, platform 106 includes unikernel disk image generator 118. Unikernel disk image generator 118 is configured to generate a disk image for a unikernel that will include the binary of an end user application as well as any components (e.g., portions of an operating system) or dependencies required to run the application as a unikernel, as well as any needed extensibility support. The various components will be included at various positions in the disk image (e.g., placed a certain number of bytes in). As described, if there are multiple applications to be executed, then multiple unikernels are built, where each may have their own set of dependencies and support requirements.

As will be described in further detail below, in some embodiments, information about the underlying hardware (for which typically there is access to/control of in an edge deployment case—as opposed to a cloud workload) is used to determine how best to build the unikernel image for improved performance on the target host hardware (host device on which unikernel guest virtual machines are to be deployed). As described above, such hardware profile information may be provided by the end user via the configuration interface provided by front end 108. For example, extra kernel support can be provided for targeting certain hardware models, where different configurations/builds may be provided for different types of ARM hardware. One example of such information is ARM ISA (instruction set architecture) revision, with different revisions indicating different types of capabilities. Further information about the target host hardware, such as microarchitecture information, may be obtained as different chips may have the same ISA revision, but have very different structures. Such information is used to configure parameters to be as close to the target hardware as possible.

In some embodiments, the end user is able to declare what type of hardware they are running. In some embodiments, platform 106 notifies users whether their hardware devices are supported. If the hardware is not supported, then a notification may be presented to the end user (e.g., via a web interface) indicating that the host hardware is not supported. For example, as unikernels are to be run as guest virtual machines, end users may be notified if the devices that they wish to use have ARM processors that do not have virtualization support (which may be determined, for example, based on ARM ISA revision). This notification allows the end user to know that their specific device is not supported for unikernels. Platform 106 may also explicitly indicate to end users what ARM devices are supported. Further details regarding providing appropriate kernel support and other components in a unikernel are described below.

The following are examples of components to be included in unikernel disk images.

In this example, building the unikernel disk image includes providing ARM support for applications to be run. This may include performing porting in order to support binaries (e.g., Linux binaries) under ARM. In some embodiments, adding ARM support includes adding low level support within the kernel of the unikernel to support, for example, architecture specific bring-up (e.g., discovering physical memory, setting up page tables, discovering devices), page table management, interrupt controllers, writing assembly entry points, configuring memory layout and privilege levels, etc.

In some embodiments, by determining the hardware profile information, binaries for the applications are chosen that are built for the target architecture (or at least as close to the actual target architecture as possible) to provide, for example, improved efficiency in instruction scheduling, software pipelining, the user of vectorized instructions, etc. For example, by knowing the ISA and microarchitecture level information (e.g., what particular variant of a chip produced by a vendor), images may be compiled that are optimized for the particular host silicon. If application binaries are too far from the target ISA, then the application may run inefficiently or might not work at all.

Applications may be written in various languages. As one example, consider applications that are written in interpreted languages, such as JavaScript code or Python code. In this case, a binary for the interpreter that is appropriate for the end user application is obtained and will be executed in the unikernel virtual machine. When executing, the interpreter loads up the code, parses the grammar, lexes it, and then creates whatever bytecode that the particular virtual machine will execute. In the example of an application written in an interpreted language, an ARM-specific version of interpreter is included. That is, an appropriate build of the interpreter that is applicable to ARM is obtained and included.

In some embodiments, based on the hardware profile information, a base hypervisor is provided that is configured to support the guests to be run.

While the techniques described herein may allow the execution of arbitrary user application binaries, in some embodiments, hardware profile information is used to select an appropriate image to be used. For example, architectural limitations may dictate selection of user program binaries, where various parameters may govern what images may be used. For example, limitations in the user-space, or the presence (or absence of) vector and DSP-specific processing hardware are examples of architectural limitations which may dictate selection of user program/application binaries.

An appropriate base kernel is also included in the unikernel disk image. The base kernel includes the support for the architecture of the platform on which the application will be run (ARM in this example). The image will also include any needed bootloaders, which, for example, have entry points into the kernel that are specific to the ARM architecture platform.

In some embodiments, which base kernel to include in the image is determined based on the information pertaining to the underlying hardware. For example, hardware configuration may be used to specify a kernel build to include in the image. For example, consider the case of making an upgrade from one version of a Raspberry Pi to another. The kernel build for one SoC versus another may vary substantially, and it may not be possible to make a unified image to support both types. This is typical in the embedded and IoT world—to have device-specific builds—unlike in the PC/server realm where universal binaries are the standard.

In some embodiments, selection/configuration of the base kernel may also be determined based on the user application binary. For example, consider the example case where the user wishes to use a proprietary binary application or commercial software product that cannot be recompiled. The kernel may be configured based on the binary being 32-bit, or for example, only building in support for 32-bit userland (or also referred to herein as user space). As another example, the kernel may be built for a much older revision of the Linux syscall interface. As another example, an older revision of an ISA may be supported through some degree of emulation within the kernel.

Appropriate base kernels may also be selected based on known issues or limitations with the underlying hardware. For example, consider the Raspberry Pi 4. Although underlying hardware has support for running 64-bit programs, the user space that is included is not set that way because there are known bugs that prevent other pieces of hardware from working. For instance, with respect to SD (Secure Digital) cards, there is a bug that, when 64-bit support is turned on, only a limited amount of the SD card may be addressed, regardless of the size of the SD card, and thus the Raspberry Pi 4 is shipped in 32-bit mode. Because the user space is in 32-bit, in one embodiment, given information that the host hardware is to be Raspberry Pi 4, then an upgraded kernel for the host is provided, and the user space is upgraded as well.

In this example, any needed drivers are also obtained and included in the kernel module of the unikernel. In various embodiments, these include backend drivers for disk and network. Some of these drivers may be for HVM (hardware virtual machine) devices, where the hardware is being emulated to some standard or chip specification. There may also be drivers for paravirtualized devices where there are interfaces exposed through virtualization (and that are not related to any kind of hardware device model). These include, for example, virtio for network and block devices under Xen, where hypercalls are used.

In this example, suppose that passthrough extensibility/functionality is requested by the end user, for example, to allow unikernel guest virtual machines to access peripherals connected to the host ARM device. Such extensibility is also supported using the techniques described herein, such that access to devices connected to a host device (e.g., through USB or other connections) may be provided to the unikernel guest VMs. For example, appropriate drivers are added to the kernel driver as well based on the requested passthrough functionality. In some embodiments, the hardware profile information includes an indication of what peripherals an end user wants to have exposed to guest unikernel virtual machines. This information is then used to include drivers required for those peripherals (e.g., for USB, PCI, etc.). This is in contrast to typical guest operating systems, which include numerous drivers of various types, even if they will not be used. Thus, support in the kernel (e.g., drivers) that is required for the hardware context is included in the image. As these drivers are included based on hardware profile information, unneeded drivers are not included in the disk image. In this way, the unikernel only includes what is required to support the application and the requested service.

In some embodiments, with respect to drivers for extensibility, a guest-side driver is added to talk to that device (e.g., to the host from the guest unikernel virtual machine, through the hypervisor). As one example, the guest-side driver is the backend of a paravirtualized device that is exported by the hypervisor. For example, Xen and KVM have USB passthrough interfaces, where in the case of Xen, it is paravirtualized (and not trying to emulate hardware such as a PCI device or USB controller). In the example case of USB passthrough support, the guest-side driver is included for the controller to access the USB device. This is while maintaining the USB drivers on the host-side or hypervisor. That is, the guest-side driver is for the passthrough backend, whereas the front end driver is what exists in the hypervisor (e.g., on the Xen or KVM side). Thus, implementing a backend driver for passthrough includes implementing a portion of a paravirtualized interface to a hypervisor. An interface is exposed directly to the application. The needed guest-side driver for the desired passthrough support is included in a kernel module of the unikernel. Further driver support may be included in the image to allow multiplexing not only multiple USB connections into a single guest unikernel, but into multiple guest unikernel virtual machines.

On the host side, during deployment, configuration may also be performed to broker access to a peripheral device on the host device. This host-side brokering may be facilitated, for example, by a host-side driver. In some embodiments, a driver is implemented at the hypervisor level, such that intermediate data is shared with a unikernel. As another example, a driver is entirely encompassed within the unikernel, with direct access to hardware. That data may then be fed to other unikernel guests through shared pages set up by the hypervisor. For example, as described above and will be described in further detail below, in order to provide some services or tasks, multiple applications may be needed. As unikernels are single process systems (and multiple applications or programs are not allowed to run on a single unikernel), the multiple applications are run by instantiating a separate unikernel guest virtual machine to run each application. Thus, there is not the case that there are multiple programs on a single virtual machine sharing a device. Rather, the applications will be broken up into different virtual machines. This also has implications for multi-tenancy on ARM devices, where there are multiple guest unikernel virtual machines that do not (and should not) necessarily trust each other.

The unikernel disk image is then built using the end user application binary (which includes an ARM executable in the ELF format or specification) and the above components (e.g., base ARM kernel module (with appropriate drivers), base interpreter, required dependencies, etc.) required to run the application on the host ARM devices. The above components may be included in a package, where there may be different sets of packages for different ARM architectures/hardware profiles. In some embodiments, preconfigured packages may be used/provided. In other embodiments, users may supply their own packages. For example, as described above, various types of components may be selected and included in a unikernel disk image based on hardware profile information in order to improve performance for the target hardware on which the unikernel guest virtual machines are to be deployed. In some embodiments, various types of support for different types of target hardware may be preconfigured (e.g., packages for certain ARM ISA revisions, packages for certain types of extensibility, etc.).

The following are example techniques for generating the unikernel disk image by combining together the various components required to run the end user application on the target host ARM device.

In this example, when the disk image for the unikernel is built, the disk image is created in an isolated build environment (separate, for example, from other unikernel disk image builds). Within the build environment, the various components that are needed to build the disk image are included in the disk image being generated. In this example, the isolated build environment cannot be reconfigured and cannot be sshed into. Within the build environment, the various components that are needed to build the image, such as those described above, are cloned in.

In this example, suppose that the application to be converted is written in an interpreted language, and a corresponding runtime interpreter is also to be executed. An executable binary 114 for the runtime interpreter is also included in the unikernel disk image. Thus, as shown in this example, the end-user application binary 112 and the interpreter/runtime binary 114 are included in the set of binaries 110 to include in the unikernel disk image.

Suppose, in this example, that the interpreter is a dynamically linked binary (e.g., Executable and Linkable Format (ELF) file). Because the runtime is dynamically linked, the interpreter will ultimately require being linked to various libraries in order to execute properly.

In this example, when building the unikernel disk image, two options are provided for linking the runtime, where the linking also further includes symbol resolving. The first option is to, at unikernel build time, link the runtime to generate a standalone statically linked runtime binary. The second option is to configure the unikernel disk image such that the runtime will be dynamically linked at runtime (e.g., when the unikernel is deployed as a virtual machine on a hypervisor at runtime).

The first option of generating the statically linked runtime binary is described here first. The second option, in which the runtime interpreter is dynamically linked at runtime, will be described in further detail below.

In this example, interpreter 114 is passed to statically linked binary generator 116, which is configured to transform the dynamically linked interpreter into a standalone, statically linked binary.

One example of generating a statically linked binary is as follows. The runtime interpreter executable is loaded up into memory. All of the libraries required by the runtime executable are loaded up and linked to the runtime executable. As part of the linking, symbol resolution is also performed. Before the runtime is executed, a snapshot of the linked runtime interpreter executable is taken in memory, where the snapshot is outputted as a standalone, statically linked object.

Thus, the dynamically linked runtime interpreter binary has been converted into a standalone, statically linked executable version of the runtime binary. The statically linked binary is now portable, and includes whatever libraries are required by the interpreter. In some embodiments, tools such as Statifier or Ermine are used to implement the statically linked binary generator 116.

As will be described in further detail below, the standalone runtime executable (e.g., in the ELF64 format) generated as output of the processing performed by statically linked binary generator 116 will then be incorporated (along with the unmodified application binary 112) onto the unikernel disk image being generated.

In this example, the unikernel disk image that is built will include both the end user's application code (in the form of the received binary 112), the statically linked runtime interpreter, as well as system code corresponding to the portions of an operating system required for the end user application to run (e.g., a minimal set of libraries corresponding to portions of an OS that implement mechanisms or services to drive hardware or communicate network protocols—e.g., device drivers, file systems, threads, networking, etc.).

Unikernel disk image generator 118 is configured to generate a unikernel disk image. The unikernel disk image generator is configured to generate a disk image that includes system code that will execute at runtime, when the unikernel is deployed as a virtual machine (e.g., spun up on a hypervisor). The system code included in the disk image includes code for booting up the unikernel, as well as underlying runtime code for implementing calls or requests for services made by the end user application (via the runtime) and to interact with a virtual machine's resources. Unikernel disk image generator 118 further includes merge engine 120, which is configured to incorporate the received binaries (runtime interpreter and byte code) into the disk image, which can then be outputted and deployed on a hypervisor as a unikernel virtual machine.

The unikernel disk image includes code for booting up the unikernel system. This includes a bootloader that performs system initialization and setup. The bootloader is placed in the master boot record of the disk image at a known location so that it can be accessed by a BIOS or UEFI at unikernel virtual machine bootup. When the virtual machine is spun up, BIOS code is run, with a limited amount of memory available to be addressed. After the BIOS performs its operations, it jumps into the bootloader at the predefined address or location. The bootloader provides the handoff between the BIOS to the unikernel system, where the bootloader takes control from the BIOS to load up the unikernel system. In some embodiments, because the same bootloader code may be used across different builds, a copy of the bootloader that is already compiled is cached and used in the build environment. In this way, the bootloader code need not be recompiled each time a unikernel disk image is built.

In some embodiments, a loader is further included in the disk image. In this example, the loader is configured to load, at runtime (when the unikernel is deployed on a hypervisor), the interpreter. The loader may be placed at an appropriate location of the file system layout (of the file system added to the disk image as part of the build environment, described in further detail below). The loaded runtime binary will be read to read sectors, create memory regions, allocate memory, etc. Loading the runtime also includes reading symbols from a known location of the runtime in order to perform symbol interpolation. Performing symbol interpolation includes merging the symbols of the runtime ELF with unikernel system symbols. Symbol interpolation further includes the storing of addresses and function names for components of the kernel or lower level code needed to support the code interpreted and executed by the runtime interpreter (when running the end user application).

The disk image further includes code for jumping into the starting point of the binary to be executed as a unikernel.

In the above example, the runtime that is included in the disk image is a standalone object that is statically linked. As will be described in further detail below, if the linking of the runtime is to be performed dynamically, then a linker is also included in the unikernel disk image, which will also perform dynamic library linking as well as the symbol resolving described above.

The various runtime code described above to be executed is compiled together into the unikernel disk image being generated. With the unikernel runtime code incorporated into the unikernel disk image, the runtime interpreter and the user application binary are then also included in the unikernel disk image, for example, using merge engine 120.

Merge engine 120 is configured to append or mount the runtime and end user application binary to the disk image containing the unikernel system code (e.g., bootloader and runtime). In some embodiments, the unikernel system code forms one binary, while the runtime and end user application are additional binaries. As one example, the runtime interpreter binary and the end user application binary are concatenated with the unikernel disk image including the system code. For example, rather than cross compiling code, as in existing techniques, the runtime interpreter and end user application are tacked onto the tail of the disk image. The end user application that is appended to the disk image is also pointed to so that it can be interpreted by the runtime interpreter.

Thus, an enclosed unikernel system is generated that includes the binary of the end user application, the binary of the ARM build of the runtime interpreter needed to execute the byte code of the end user application binary, as well as the minimal set of components required to run the user application as a unikernel and to provide any needed extensibility support (e.g., passthrough).

Dynamic Linking of the Runtime/Interpreter

In the above example of FIG. 1, the dynamically linked runtime executable was transformed, during build time, into a standalone, statically linked binary object, where the standalone object was then appended into the unikernel disk image. As described above, this is one option for linking the runtime/interpreter binary.

As another option, the runtime is dynamically linked at runtime, when the unikernel is deployed and initializing. In this option, rather than converting the runtime at build time, the disk image is set up to perform the linking/symbol resolving dynamically, at runtime.

For example, referring to the example of FIG. 1, based on the format of the end user application binary, a pre-built environment associated with a compatible runtime/interpreter is loaded onto the unikernel disk image (e.g., using the merge engine 120 as described above). A linker is also included in the unikernel disk image when the disk image is being built. When the unikernel is booted up as a virtual machine at runtime (e.g., in VirtualBox), the dynamically linked runtime is loaded (e.g., via the ELF loader included in the unikernel disk image). The runtime is then dynamically linked by the linker. Symbol resolution is also performed dynamically, as well as memory layout preparation. In some embodiments, any libraries that are needed are included in the file system so that the libraries may be copied over during the linking process. By performing the linking dynamically, no intermediate binaries need be created (e.g., the dynamically linked binary need not be converted into a standalone, statically linked binary).

After the required libraries are linked to the runtime/interpreter binary, the linked runtime is then run (e.g., by entering the entry point of the runtime/interpreter), where the path of the end user application binary is passed as an argument to the runtime. The runtime then loads the end user application binary and runs the end user application.

Thus, the linking and resolving can be performed as part of the disk image generating process, or performed dynamically at bootup of the unikernel.

In some embodiments, the user that wishes to build the unikernel disk image is presented, during build time, the option of having the runtime (or their user binary) converted to a statically linked binary, or to have the runtime loaded up in memory at runtime and the library linking performed dynamically. One reason that a user may specify dynamic linking is to perform debugging.

Using the techniques described above, a unikernel disk image may be built/created using the end user's application binary, without requiring modification. This has various benefits, such as that access to source code is not needed (and in some cases may not be allowed anyway), and thus arbitrary binaries may be loaded. Here, pre-made ARM packages that include appropriate interpreters can be included to run the user's application(s). This is in contrast to library operating systems such as MirageOS, where, due to their system call interface, certain boundaries are erased that are present in the calling convention. Because of this, it is not possible for arbitrary binaries to be loaded. Rather, applications must be compiled from the source to fit into that runtime.

However, in some cases, cross-compilation and access to the source code of an application may be needed, for example, if a user were working on an x86 based laptop. As another example, cross-compilation may be needed in the case of compiled languages, such as Go. In this case, the program may need to be cross-compiled, with a disk image created out of that result. The cross-compiling may be done by the end user, or by the platform generating the disk image. The unikernel build techniques described above may be variously adapted to accommodate performing cross-compilation (or receiving a cross-compiled binary) when building the unikernel disk image.

Thus, using the techniques described herein, arbitrary or ad hoc binaries (e.g., in the executable and linkable format) can be converted into unikernel virtual machines, without requiring access to a source code. Instead, unikernels are built by converting existing binaries into unikernel virtual machines.

Deployment of the Unikernel Virtual Machines on the ARM Device

Figure 2:
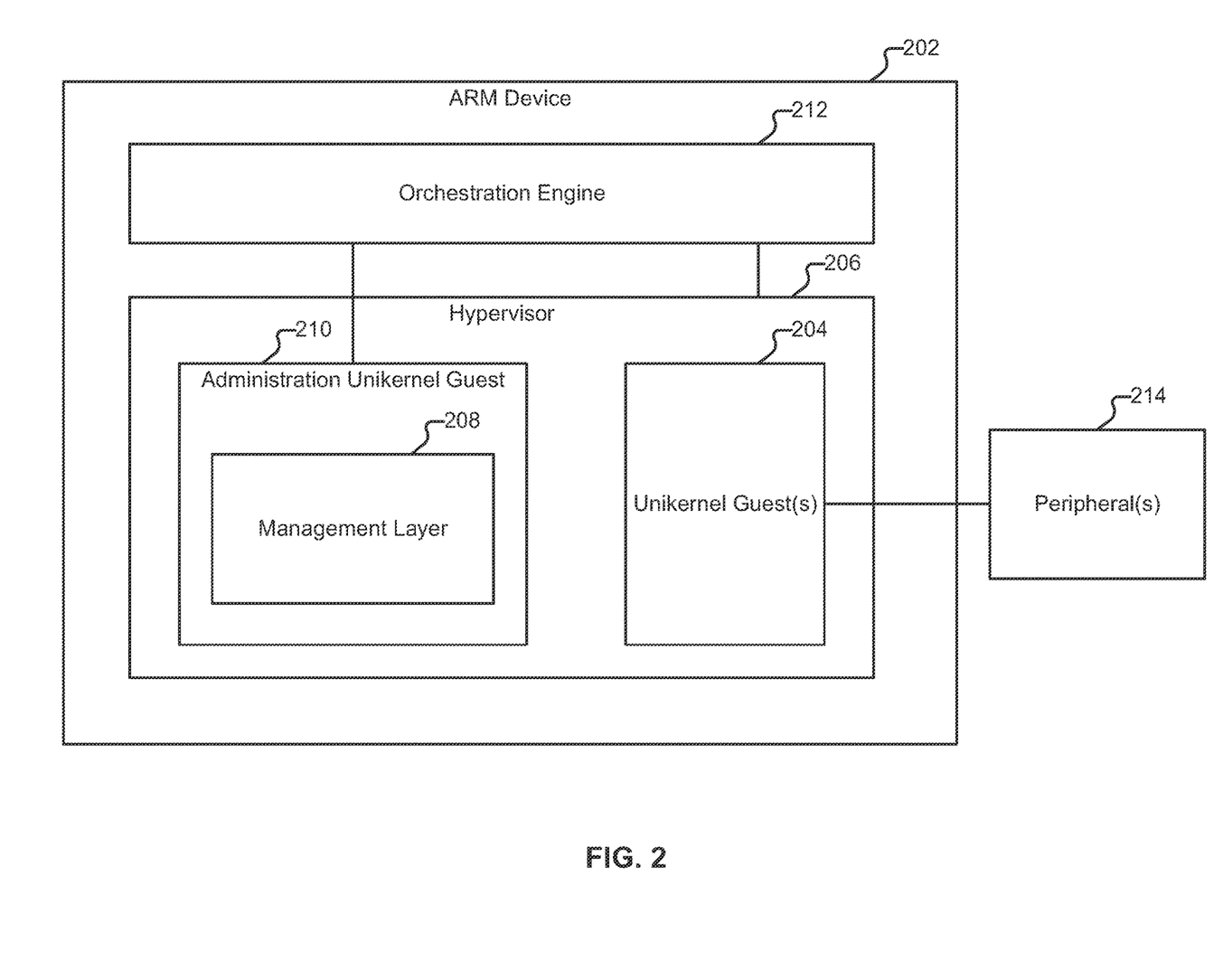
FIG. 2 illustrates an embodiment of an environment in which unikernel virtual machines are deployed on a host device.

FIG. 2 illustrates an embodiment of an environment in which unikernel virtual machines are deployed on a host device. While an ARM architecture host device is described herein for illustrative purposes, the techniques described herein may be variously adapted to accommodate other types of host devices. In this example, the disk images that are generated by platform 106 are outputted and distributed and placed on the host ARM device 202. In some embodiments, the end user flashes their host ARM device with the obtained unikernel disk images to deploy their requested service. In one embodiment, the end user enters a command to deploy the unikernels, which copies over the images.

The running of unikernels on ARM devices in an edge deployment (versus, for example, a cloud deployment) has various implications for the management and control plane of the unikernels. For example it is less likely that users will be able to access the ARM devices remotely. There may be an expectation of the user of a large number of devices (versus say a handful of them). In many cases, such devices will not have constant or continuous network access. For example, the ARM device may be deployed in a pump jack that is 50 miles from the nearest town, and have 3G wireless access for only two hours out of the day. This has implications on how the unikernels are deployed and how they are managed, which is different from centralized data center workloads. Further details regarding management of unikernel virtual machines on ARM devices will be described below.

In contrast to a cloud workload, a set of unikernel guest virtual machines is to be deployed on an edge ARM device. In some embodiments, orchestration is provided to build a "mini-cloud" on the device. Using the techniques described herein, hardware profile information is used to configure orchestration in a way that is optimized for the target hardware and the application(s) that the end user wishes to run. This is in contrast to typical cloud workloads, where end users are typically public cloud users, where there is limited to no visibility into the orchestration (let alone the underlying hardware).

In typical cloud workloads, such as those that use public cloud infrastructure such as Google Cloud, Amazon Web Services, etc., end users do not have control of underlying hardware or of the underlying hypervisor, and therefore are unable to orchestrate the hypervisor (which the clouds do). However, this is not the case in edge deployments, where end users have control of both the host hardware and the hypervisor.

Described herein are techniques for using the direct control over the hardware to improve unikernel guest virtual machine performance on ARM devices. In ARM, as compared to other processor architectures such as x86, there is a much larger diversity and variation in the types of hardware that exist. To account for this, more explicit support is provided to improve application compatibility and performance. This can be done by controlling orchestration on the hypervisor. Orchestration includes orchestrating the hypervisor to deploy the set of guest unikernel virtual machines. Controlling orchestration on the hypervisor involves having access to various switches, toggles, and options, which can be set in various ways so that the application not only boots and runs, but runs well. Due to the diversity in the ARM environment, there are a larger number of different types of flags that may be specified.

In some embodiments, an end user is provided orchestration software (e.g., to implement orchestration engine 212) to use on a particular device. The orchestration software may be tailored to that particular type of device, where other versions of the orchestration software are provided for other types of devices. In some embodiments, the orchestration software includes logic for inferring or otherwise determining what device it is installed on, and what flags should/should not be set. In some embodiments, this logic is not exposed to the end user. Depending on the underlying host hardware (determined by the hardware profile information that is detected), the orchestration engine is configured to pass different flags to the hypervisor. Certain flags in the hypervisor may also be set as part of orchestration. The optimizations allow the image to not only boot up and run, but to run faster and with different capabilities. Setting such orchestration parameters is different from typical deployments to public clouds such as Google or Amazon, where such flags cannot be set, or only a preselected set of options/choices is presented. Using the orchestration techniques described herein, given hardware profile information, the optimal orchestration flags are set for a target host/underlying hardware.

In some embodiments, the orchestration software is flashed on a device. When the device boots up, a control plane is made accessible to end users, from which they can spin up guests. This orchestration software provides a management layer 208 for the "mini-cloud" being built on the ARM device. Such orchestration software may also be licensed out on behalf of other parties. In one embodiment, the management layer is a web application that controls/manages guest virtual machines on the ARM device.

Hypervisors such a Xen and KVM (e.g., through the monitor of QEMU) export various configuration options. The orchestration engine 212 is configured to determine and select the appropriate configuration options given the profile of the hardware that the hypervisor 206 is running on, as well as end user requirements for a given application. Such orchestration performed by the orchestration engine allows guests to not only boot on the host hardware, but to run with improved performance as well as to optimize the deployment of the set of unikernel disk images on the ARM device to provide requested functionality and services. As described above, this includes using detected hardware profile information about the ARM device to set particular hypervisor flags. This may include adding additional customization (e.g., additional lines of customization) to the hypervisor to ensure optimal execution of the guest virtual machine, as well as ensure isolation and security. Being able to customize orchestration flags improves upon guest unikernel performance so that running of the virtual machines is not generic and slow (or in the worst case, does not boot). Examples of hypervisor specification include specifying the ISA revision, any FPU options to be passed, flags to allow certain features to work, etc.

In some embodiments, information about the host hardware is determined by the kernel dynamically at bootup (e.g., what version of facilities are exposed by the hardware on bootup), where the information is then used to determine appropriate support to install. The underlying hardware information that is dynamically determined may include available features (where a feature may not be exposed by default to guest virtual machines by a monitor unless a special switch is enabled).

One example of detecting hardware profile information is to perform enumeration. In some embodiments, a guest enumerates hardware that is exposed to the guest. The guest can take appropriate actions or otherwise use those features. The host (outside of the guest) can also perform enumeration to configure the guest (e.g., via configuration of the hypervisor) before the guest virtual machine boots. This can be performed at runtime. The orchestration includes spinning up the guest virtual machine from the disk image, providing a network interface, etc. In some embodiments, the orchestration engine is configured to enumerate hardware profile information from the underlying host system. One example of deriving central processing unit (CPU) information about the ARM processor on the host device is to use the command cat/proc/cpuinfo. Examples of hardware profile information enumerated by the orchestration engine include information about the ARM processor (e.g., ISA), size of an SD card inserted into the ARM device, types of network interfaces, whether there are radios attached, whether the network connection is a direct Ethernet connection, the type of peripherals attached to the ARM host device, etc.

The orchestration engine 212, after obtaining the hardware profile information, then uses the obtained hardware profile information to orchestrate the hypervisor 206. The following are examples of hardware profile information that may be enumerated by the orchestration engine and used to configure the hypervisor. Examples of hypervisor orchestration flags that may be set are also described below.

As one example, the detected hardware profile information is used to specify machine types, as well as any corresponding options. This may include specifying to the hypervisor the actual machine model. These are flags that may be passed directly, for example, to QEMU, being the machine monitor. For example, a machine flag may be passed indicating the type of host hardware device the monitor is on (e.g., a Nokia tablet, Raspberry Pi 2, Siemens machine, etc.). Determining the model number allows for a determination of the hardware capabilities of the ARM device. For example, different models may have processors with different numbers of cores. As another example, some models may support virtualization whereas others do not. As another example, one model may emulate interrupts. By specifying machine type (based on the hardware detected by the orchestration engine), any code specific to/purpose built for the particular device may be utilized.

Another example of hardware profile information that can be used by the orchestration engine is the ISA (Instruction Set Architecture) revision of the ARM processor. In some embodiments, when a guest unikernel virtual machine is being spun up, a flag explicitly stating the ARM revision may be passed or set in the hypervisor. Based on the ARM ISA revision (e.g., v7 versus v8), different flags related to privileges, memory, FPU (floating point unit) support, etc. may be set. The ISA revision may indicate what resources or capabilities are supported by the host device. As one example, if the device is ARM v8, then it is determined that the host device supports full virtualization extension support. However, if it is determined that the host device has an earlier ARM revision, then it may be the case that the host device is more resource constrained, and that provisioning of unikernel virtual machines on the host device should be prevented or otherwise limited. In some embodiments, supporting such facilities further includes patching a host kernel on the host device (such as the general interrupt controller). In some embodiments, such patches are part of the initial hypervisor/orchestration system provisioning.

The orchestration engine may also be configured to assign resources to guest unikernel virtual machines based on hardware profile information. As one example, the orchestration engine may configure the hypervisor to assign different threads or numbers of threads to each guest unikernel virtual machine as part of the orchestration process.

In some embodiments, the orchestration engine includes logic for providing friendly fail. For example, suppose that the end user has an image with which to flash their ARM device, which is a Raspberry Pi 3. The end user has bypassed previous explicit instructions that the image will not run on the Raspberry Pi 3. However, the user has built the image, downloaded up, and then attempted to boot the image. The orchestration software can detect that the hardware is unsupported, and indicate this to the end user.

The orchestration engine is also configured to support the various types of extensibility that might be requested, in addition to having the appropriate driver/code support for the application (e.g., to support a pressure sensor versus an inertia sensor versus a camera, etc.). For example, as there may be multiple guests accessing multiple different types of external devices/peripheral to provide desired functionality, using the orchestration techniques described herein, such access can be brokered/managed among the various guest unikernel virtual machines deployed on the host device.

As one example, the orchestration engine is configured to set certain hypervisor settings to improve passthrough performance (e.g., for USB or GPU passthrough). For example, flags may be passed indicating that passthrough of a peripheral device 214 (as well as its type, such as PCI or USB) to a guest unikernel virtual machine is to occur. The end user may indicate (e.g., through the web interface of the orchestration engine) what virtual machines to spin up and what peripherals are to be attached to the ARM device (where this may be user driven on their applications, and not all attached peripherals may necessarily be used by the end user's applications). For example, different flags are passed for different types of devices. For example, if, via the user interface provided by the orchestration engine, an end user has specified the use of a GPU (graphics processing unit) that is on a PCI slot, then the orchestration engine specifies to the hypervisor to allow GPU passthrough when spinning up a guest unikernel VM (e.g., by setting the flag—device virtio cpu pci). Here, the flag indicates to the hypervisor what device is attached and which virtual machine should be allowed to have passthrough access to that attached device.

If the user has specified which guest unikernels can access which peripherals, this is also controlled by the orchestration engine by specifying various hypervisor flags. For example, it may be the case that only one VM should have access to a certain peripheral, while another VM is explicitly prohibited from having passthrough access to that same peripheral (the orchestration engine thereby providing a form of access control, but to VM guests, rather than users). This form of access control or "virtualized hardware firewall" may also be configured in cases of multi-tenancy, which becomes more viable as ARM devices become increasingly complex with more cores.

Compiler settings may also be set by the orchestration engine. In some embodiments, device capabilities are determined based on the hardware profile information. In some embodiments, the most specific device information is used to select or set the compilation flags. The compilation flags are not necessarily used by the orchestration process to compile the application, but allow the orchestration process to select, from an array of options, those options that best suit the particular underlying host hardware, where the hardware processor may be tied to a specific ISA revision. For example, the hardware information may indicate tunable parameters when the chip was synthesized, the number of arithmetic logic units (ALUs) that can be scheduled for, etc. This information is then used to determine compilation flags. For instance a qemu flag of "-machine raspi2" or "-machine swift-bmc" could set certain optimizations/features for different hardware profiles. Similarly a flag of '-cpu max' could be set to enable certain instruction sets that are not on by default such as the SIMD SSE4_1 cpuid.

The following are additional examples of compiler flags that may be used to enable (or disable) optional features (e.g., auxiliary features that may or may not be synthesized into a core by a silicon vendor):

"3.18.1.1 -march and -mcpu Feature Modifiers

Feature modifiers used with -march and -mcpu can be any of the following and their inverses nofeature:
  'crc'
  Enable CRC extension. This is on by default for -march=armv8.1-a.
  'crypto'
  Enable Crypto extension. This also enables Advanced SIMD and floating-point instructions.
  'fp'
  Enable floating-point instructions. This is on by default for all possible values for options -march and -mcpu.
  'simd'
  Enable Advanced SIMD instructions. This also enables floating-point instructions. This is on by default for all possible values for options -march and -mcpu.
  'lse'
  Enable Large System Extension instructions. This is on by default
  for -march=armv8.1-a."
e.g.
"-march=armv8.1-a+crypto"
"-march=armv8-a+crc    -mfpu=neon-fp-armv8 -mcpu=cortex-a53"
"-march=armv8-a+nofp+nosimd"

In some embodiments, deploy-time orchestration includes both static and dynamic hypervisor configuration. For example, some host hardware profile information may be known statically at orchestration time. However, the existence of some kernel-side capabilities (e.g., as exposed by vm monitor) may only be determined dynamically at bootup time of a unikernel guest virtual machine.

In this example, the orchestration engine is effectively a root/user, albeit a limited locked down version, where the guests become a type of user (although the guest VM can only run a single program, and there is no interactivity). This is a form of transforming the role of how various privileges interact.

The hypervisor then provisions and deploys the unikernel guest virtual machines (204) according to the configuration performed by the orchestration engine.

Administration Guest Virtual Machine

As described above, the orchestration process described above is managed by a management layer. The management layer communicates with an orchestration engine (e.g., software module) that passes or sets flags in the hypervisor when deploying a set of guest unikernel virtual machines to satisfy a service request.

The management layer provides an orchestration mechanism by which to provision and manage a private "mini-cloud" of unikernel guest virtual machines on the host ARM device. The independent management layer is used to manage the guest virtual machines, as in edge deployments, the workloads may not be directly addressable (as they would be in typical cloud workloads).

As ARM devices continue to mature, their hardware capabilities will continue to improve (e.g., with more cores added, further access to more threads, etc.). It would be beneficial to have the management layer in its own guest virtual machine, removed from the host layer. Exposing of any functionality that the end user desires or is comfortable with can then be done through the management layer.

In some embodiments, a separate administration guest virtual machine 210 is run on the hypervisor on the host ARM device, where the guest virtual machine includes the management layer that the end user has access to. The administration guest virtual machine would then be used for the management of applications running on the ARM host device. Using this management guest virtual machine, the end user can manage unikernel virtual machines running on the host ARM device, such as adding new guests, removing existing guests, performing updates/upgrades, etc.

Having a separate management guest unikernel virtual machine also has various security benefits. For example, improved isolation is achieved because the management guest virtual machine only exposes whatever the end user who wrote the management virtual machine wanted, which limits what can be exploited (thereby minimizing its abuse, as it is effectively now "root"). That is, the functionality that is exposed is isolated. This is in contrast to guest virtual machines that run full guest operating systems such as Linux, which provides the ability to run multiple different programs, allows remote logins, has interactive functionality, etc.

In some embodiments, the unikernel guest management virtual machine is a privileged unikernel guest virtual machine. If there exists a host system (e.g., Linux), it may be orchestrated by the guest management virtual machine.

In some embodiments, the management layer exists on the same privilege plane as the end application (that is, both will have access to each other). With the management plane isolated as a unikernel, an attacker can still do potential damage: a) the code is isolated to whatever is running as the guest and b) if the attacker is trying to break a non-privileged guest, it will be difficult to break the management layer.

Further, the guest virtual machine that is not a management virtual machine would have no access to an end user—not in the form of a remote login or shell other than what an end user might code in (e.g., some form of a webshell)—but no capability of running other programs. This is in contrast to a bare metal Linux installation that comes pre-installed with hundreds of programs, libraries, interpreters, etc. (and which is the same case for virtualized Linux guests as well).

As one example, suppose that the management layer is written in the Go computing language. It is difficult to shell out. A nefarious entity would not be allowed to run a program that is non-Go, meaning that they are restricted to whatever can be done in the Go runtime, where they cannot simply upload new Go files or perform other types of actions. Thus, having the management layer in a separate unikernel guest virtual machine imposes heavier restrictions as compared to, for example, a full Linux guest operating system, where the end user can download new interpreters, upload random binaries, etc.

Having such isolation by having the management layer in a guest unikernel is also beneficial in scenarios where trust is unknown. For example, to provide a service, multiple programs may need to be run. However, the various programs and modules may be written by different entities, where an entity overseeing the running of the programs may not be certain whether the other entities who wrote the programs should be trusted. This also extends to dependencies, where an application may have numerous dependencies, but the sources that wrote those dependencies may be unknown, and potentially should not be trusted.

In some embodiments, to deploy the management unikernel guest virtual machine, the end user is provided with a disk image that is flashed to a given device with the management virtual machine pre-installed.

Updating ARM Devices

The unikernel orchestration techniques described herein may also be used to provide improved updating of ARM devices. Existing techniques for updating ARM devices have a variety of security issues. For example, for devices such as baby monitors, security cameras, and other Internet-connected smart devices, a common existing way of performing updates is to have one partition with the old system on it, download a new disk image, mount a new partition, and put the new disk image on the partition and reboot. This is not a reliable way to perform updates, and has many potential security vulnerabilities.

In one example technique for updating ARM devices, the orchestration engine configures the hypervisor to deploy/provision multiple guest unikernel VMs. For example, one VM is used for command/control if needed. Other VMs are individually isolated from each other, which provides multi-tenant security. Thus, even if a nefarious entity finds a problem and exploits one of the VMs, there is a barrier to the nefarious entity accessing a neighboring VM and attacking it.

Figure 3:
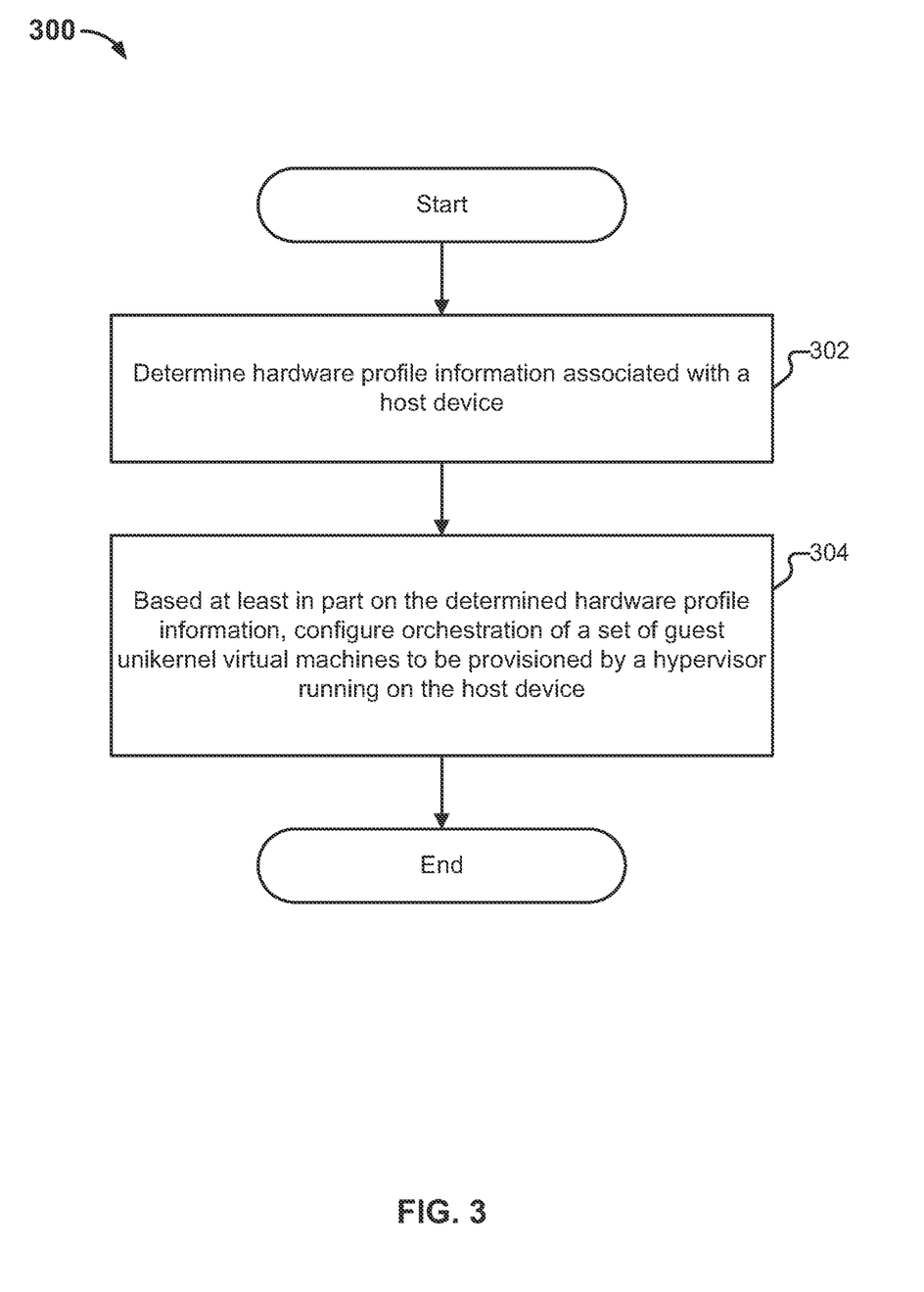
FIG. 3 is a flow diagram illustrating an embodiment of a process for configuring orchestration of guest unikernel virtual machines.

FIG. 3 is a flow diagram illustrating an embodiment of a process for configuring orchestration of guest unikernel virtual machines. In some embodiments, process 300 is executed by orchestration engine 212 of FIG. 2. The process begins at 302 when hardware profile information associated with a host device is determined. As described above, one example of determining hardware profile information is to perform enumeration. At 304, based on the hardware profile information, orchestration of a set of guest unikernel virtual machines to be deployed or provisioned by a hypervisor running on the host device is configured. In some embodiments, as described above, configuring orchestration includes setting or passing flags to the hypervisor for provisioning or otherwise deploying the guest unikernel virtual machines.

Further examples and embodiments of the orchestration process described above are provided below for illustrative purposes.

Additional Examples and Embodiments

Image Inference Example

Suppose, for example, that road improvements are to be done to a busy street, and a user would like to count the number of cars that come across it. The user would like to use unikernels (versus, for example, a full Linux VM) due to the desire for increased isolation and security. In this example, the user would like to use an ARM device to count the number of cars. For illustrative purposes, the use of a Raspberry Pi 4B ARM device is described, but other ARM devices (or devices with processors of other architecture types) may be used, with the techniques described herein adapted accordingly. In this example, in order to facilitate the parking lot image inference, a USB camera (e.g., to capture images) and a co-processor (e.g., Intel Neural Compute Stick to accelerate computer vision, machine learning, etc.) are also to be used, and are connected to the ARM device via a connection such as USB (Universal Serial Bus). In this example, in addition to deploying unikernel virtual machine(s) on the ARM device, USB passthrough of the hardware attachments through the hypervisor (so that they may be accessed by the unikernel VMs to support the image inference service) is also facilitated, supported, or otherwise provided. This includes having drivers in both the guest unikernel virtual machines and on the host, as well as a management layer for the host drivers. Further, this scenario involves multiple hardware devices that could be segregated or multiplexed.

In this example, suppose that the implementing of the requested task or service of image inference requires the use of multiple applications, such as a program that uses the USB camera to take pictures (e.g., ffmpeg), and a separate application that uses the neural compute stick/co-processor to perform computer vision analysis on the taken images in order to count the number of cars passing through the street (e.g., Python OpenCV). As described above, due to unikernels being single process, in order to implement the multiple applications, a unikernel is deployed for each application. That is, there are at least two unikernels that will be generated.

For example, one unikernel guest virtual machine is built using the unikernel build techniques described above to include the ffmpeg software and will be configured to have passthrough access to the usb camera (e.g., to take a picture every second). In some cases, its constituent libraries such as libavcode and libavformat may be used instead as there may be other auxiliary tasks involved (such as cleaning up old images which could quickly fill up available space). The other unikernel guest virtual machine is built including the OpenCV python script provided by the end user. The orchestration engine then configures deployment of the guest unikernel virtual machines with passthrough access, as described above.

The images taken by the first unikernel guest are then piped into the other unikernel guest running the computer vision application, which offloads its inferencing to the neural compute stick to allow for much faster performance.

Figure 4:
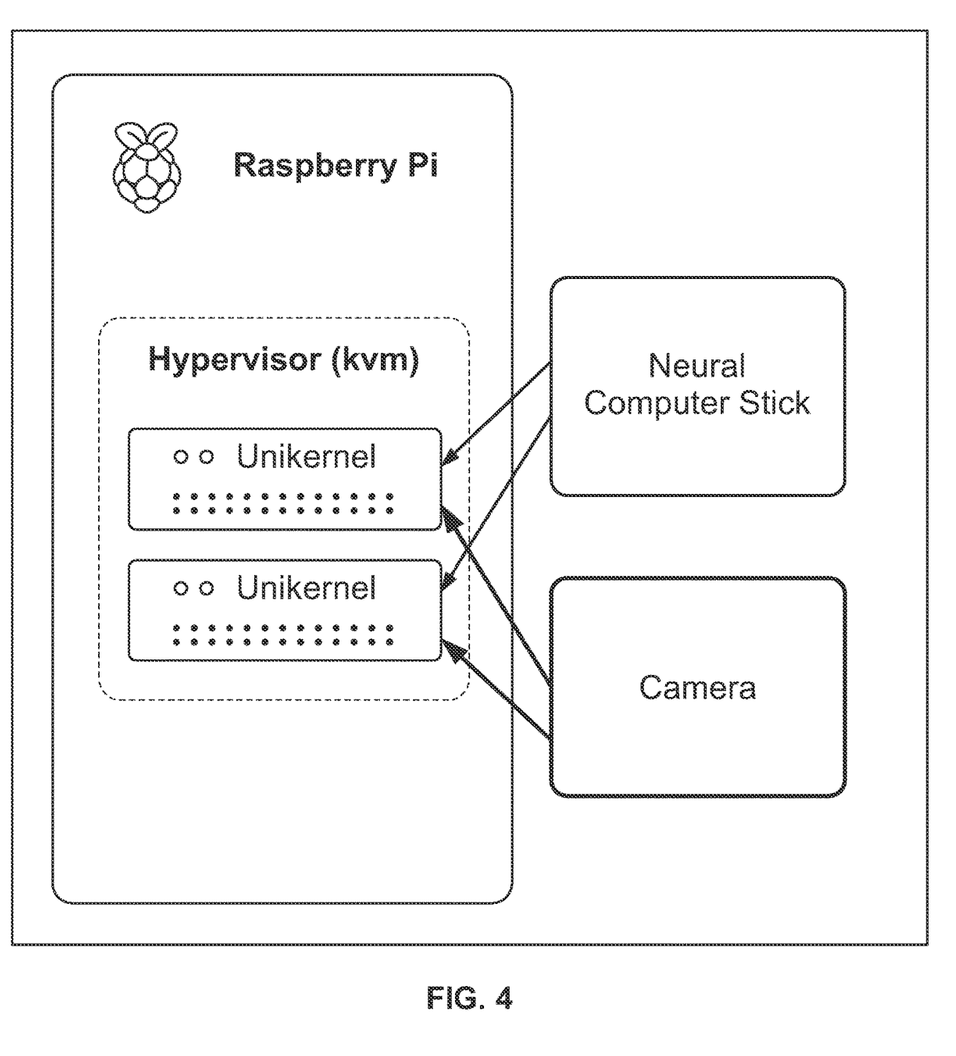
FIG. 4 illustrates an embodiment of a system in which image inference is performed using guest unikernel virtual machines deployed on a host ARM device.

FIG. 4 illustrates an embodiment of a system in which image inference is performed using guest unikernel virtual machines deployed on a host ARM device.

As described above when building unikernels, a platform such as platform 106 packages up an executable with all of its dependencies and creates a disk image. The disk image in this case would be an ARM architecture build (both kernel and application being deployed).

In this example, suppose that the machine learning application is implemented by using OpenCV python scripts (example of end user application). In this case, the disk image would involve an ARM architecture build of a python interpreter, associated libraries that go with it, the model(s) being used, and the end user's application. In some embodiments, the end user provides the end application and possibly different models. The interpreter, libraries, etc. may come in the form of a 'package' that the user can select (such that the end user is not expected to compile the components from scratch). Libraries that may be included in such a package may include, for example, tensorflow, opencv-python, keras, imageai, a retinanet model, etc. The following are further example details of building a guest unikernel virtual machine to run the OpenCV python scripts.

In this example, without detecting hardware profile information about the host hardware and making optimizations, certain operations may not be possible. For example, without hardware acceleration an inference operation might take minutes (rather than the seconds it would take if hardware acceleration were available).

Using the techniques described above, the unmodified scripts may be combined with preconfigured packages such as a base ARM kernel, base ARM python interpreter, etc. to generate a unikernel disk image, without having to modify the python application. By using for example, a pre-made ARM package, the user would not have to compile their own python interpreter (as an appropriate interpreter would be provided). Here, the user provides their python scripts, which are interpreted by an ARM-specific python interpreter that is included when building the unikernel disk image. The python interpreter would then be executed on the unikernel running on the ARM host device, where the python interpreter takes the python script and generates bytecode.

The prepackaged interpreter may also have a preconfigured configuration. For example, the interpreter may include CFFI (C Foreign Function Interface) bindings because Python scripts themselves may be too slow to perform some of the requested functions. With the included bindings, the Python scripts may be linked to a native C library (e.g., math libraries) used to speed up processing. In this example, bindings and any needed C libraries or dependencies for running the requested service are included in the disk image at build time, as there will not be an opportunity for the unikernel to obtain and install such packages after being deployed, since such interactivity is not allowed (e.g., running sudo apt-get install on such virtual machines is not allowed).

In this example, to support improved performance of the OpenCV Python scripts, the unikernel disk image includes a base general Python package, as well as another package for support for the requested functionality that includes the C libraries for speedup, as well as other configuration data and environment variables.

In this example, a base image is created (for each application to be run to satisfy the requested service). In one embodiment, the base image is in the format of a tarball (e.g., tar.gz). The end user downloads the tarball and indicates what files to include in the file system. The unikernel build engine then (dynamically) generates the file system, and outputs a disk image that can be run on a hypervisor.

The user then deploys the disk images (e.g., unikernels for Python Open CV, ffmpeg, etc.) on their host ARM device in order to implement their service for counting cars.

As described above, in some embodiments, a management guest virtual machine is deployed to facilitate management, control, and orchestration of the guest unikernel virtual machines deployed on the host ARM device.

In this example, the orchestration engine determines that a camera is to be used, and that the guest unikernel virtual machine running ffmpeg should have passthrough access to the camera. The orchestration engine then configures the hypervisor to allow such passthrough access when the hypervisor creates the ffmpeg unikernel guest. As described above, this provides a form of access control, where one VM guest is limited to communicating with the camera, while the VM guest running the python OpenCV is limited to communicating with the neural compute stick peripheral. Access to the devices may be multiplexed among the guest unikernel virtual machines, such that each of the guest unikernel virtual machines has access to both of the peripherals.

The following is an example of performing hypervisor orchestration to allow USB passthrough for the python/OpenCV unikernel guest virtual machine. In a first step, the current USB configuration is obtained (e.g., via lsusb). This provides the bus and address, which may be passed to the virtual machine monitor (e.g., QEMU). As a second step, the USB device is assigned to the guest. The following is an example command for/flag setting for assigning the device to the unikernel guest: "-usb -device usb-host,hostbus=2,hostaddr=3" (where the bus and device ids are taken from lsusb).

The administration guest unikernel virtual machine having a management/orchestration layer as described above is beneficial when direct or manual control of endpoint devices (e.g., in edge deployments) is difficult or infeasible. For example, suppose that rather than counting cars on a road, the requested service is to count cars coming and going through multiple parking lots. For example, suppose that a computer vision company is responsible for managing all of the parking lots for the American locations of a business. This could include thousands of sites. The administration guest VM can provide a management layer by which to manage the thousands of edge ARM devices used to perform the count, as it is not feasible for an end-operator to manually intervene with all of the end devices (e.g., it is infeasible for an end-operator to be ssh-ing into such numerous devices). Existing remote human-management techniques are not practical, as there would be an overwhelming number of devices and servers to be observed. Unikernels and the management techniques described herein would allow this scenario to be more feasible, by allowing these numerous devices to be controlled in a more "fleet-type" fashion.

RTU/SCADA Example

The hypervisor orchestration techniques described herein may be used to provide enhanced security for SCADA (Supervisory Control and Data Acquisition)/RTUs (Remote Terminal Unit): SCADA systems are used to control various systems, such as those for controlling hydrodams, nuclear powerplants, etc. The RTUs facilitate physical aspects of controlling such systems, and communicate with digital systems. Such RTUs typically run embedded Linux. There are various security vulnerabilities and issues with existing RTUs that can be dealt with by using unikernels, as they do not allow remote access or multiple processes. Thus, a unikernel capable of running arbitrary Linux programs (e.g., on an ARM processor) would provide security enhancements over existing RTUs.

There are potential security and infrastructure problems with existing systems (which may be using embedded Linux without VM isolation) due, for example, to the different devices connected to water dams and connected to power grids, which may be communicating using a protocol such as MODBUS that is plaintext, with no authentication (where it may be possible to skim for such devices because the communication is out in the clear). Thus, the isolation of unikernels is particularly attractive in such deployments. For example, while it might not be possible to stop an operator from connecting MODBUS directly to the Internet, unikernels may be used to limit nefarious entities from taking advantage of such a connection to gain access to a device and infiltrate a local network.

There are various other security issues with existing RTU/SCADA implementations. One security issue is that such devices are connected to the Internet. Connections can be made to such devices using protocols such as Modbus, which is in plaintext, without authentication. These devices can be spoofed, meaning that these devices may be discoverable online, allowing nefarious users to send commands to these devices to change physical settings on power systems.

The orchestration techniques described herein may be used to solve this technical problem without requiring an upgrade to a protocol such as Modbus (which may be problematic). As one example, the two networks (one to the Internet, and one being the physical network) to which there are connections are subdivided from each other. For example, one network is the incoming TCPIP, and the other network is a physical network. The two networks are subdivided so that there is no direct path between the physical network and the Internet. This is achieved by isolating the two networks in different unikernel virtual machine guests, where the isolation is performed by configuring orchestration of the hypervisor. The following is an example of providing such network isolation.

First, the disk images are built. Consider the RTU example, which in this example includes building a unikernel guest virtual machine that includes a Modbus client written in C++. In this scenario, the orchestration engine is configured to orchestrate the hypervisor to use the disk images to create two different guests with different interfaces attached to them. For example, one virtual machine is exposed to a public interface such as the Internet (e.g., so that a remote operator can talk to the first VM). However, the other VM is cordoned off into its own guest, and is the only guest that can talk to the actual physical world (e.g., through a serial connection). While the two guests may communicate with each other, the VM with the serial connection does not have a network connection to the public infrastructure (Internet). Similarly, the virtual machine that has an interface able to communicate with the public Internet is prohibited from having access to the serial interface, which is in the other guest unikernel virtual machine. Thus, there are two VM unikernel guests running on the host, but with a virtualization-based firewall that has been created/orchestrated by the orchestration engine (e.g., by configuring and limiting passthrough access to peripheral devices for the unikernel guest virtual machines).

Figure 5:
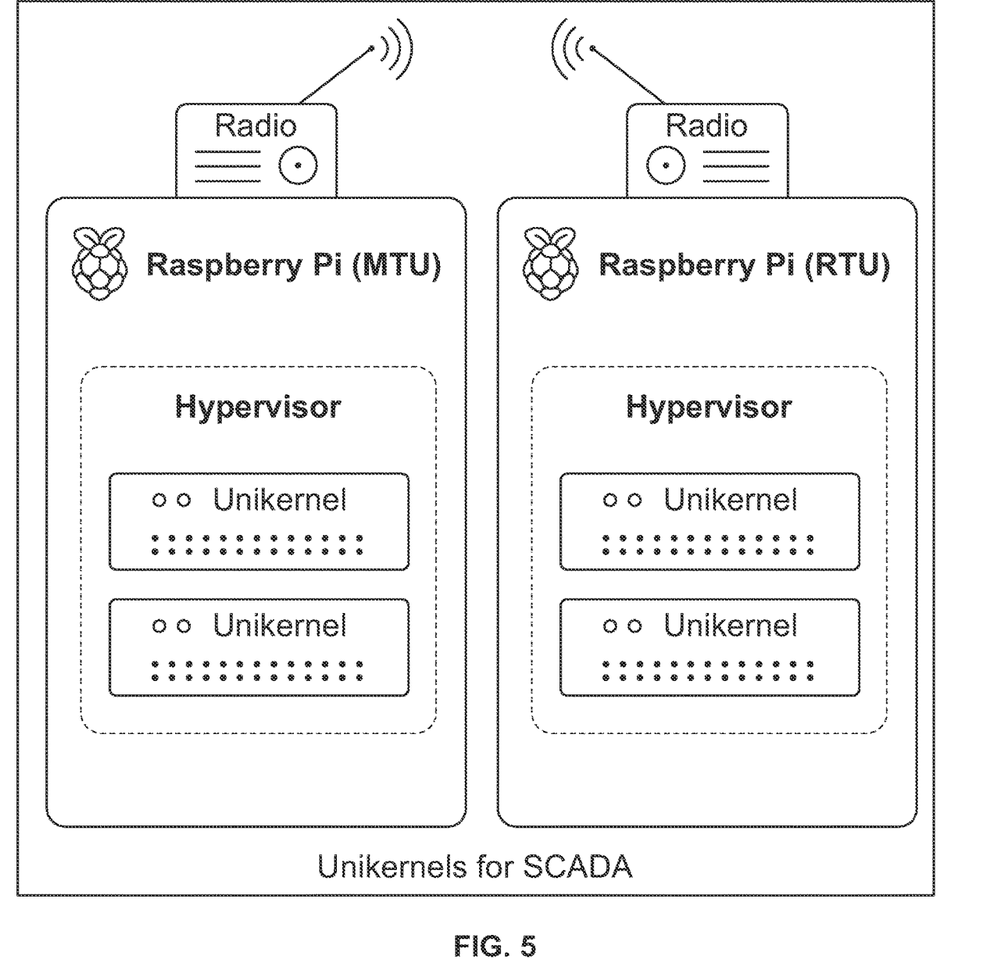
FIG. 5 illustrates an embodiment of a system for emulating SCADA using guest unikernel virtual machines deployed on host ARM devices.

FIG. 5 illustrates an embodiment of a system for emulating SCADA using guest unikernel virtual machines deployed on host ARM devices.

In this example, an ARM device (e.g., a Raspberry Pi 4B), is used to simulate the remote terminal unit (RTU). While there are various different protocols that RTUs may use to communicate, for illustrative purposes, suppose that in this example, the MODBUS protocol is being used. In this example, the RTU is to use Modbus, where communication is piped out through a connection such as a serial connection, radio (e.g., 4G radio), etc. As in the image inference example, in order to support the requested service, passthrough is facilitated so that deployed unikernels can access the hardware network connections.

In this example, the orchestration engine is configured to determine hardware profile information pertaining to the attached radio (or how the device otherwise communicates with the outside world). In this example, the radio that is communicating with the MTU (master terminal unit) is cordoned off to a specific guest while the serial interface that actually communicates with a physical component (e.g., settings for a generator or the lights in a building) is segregated to another guest unikernel virtual machine. In this way, hypervisor orchestration is configured to provide a form of hardware firewall. In this case, while the MODBUS protocol itself cannot be changed, nefarious users can be stopped from running arbitrary commands on the host containing the radio communicating to the MTU/Internet directly to the guest talking to the physical controls.

The following are example details regarding generating such a hardware firewall via orchestration. In this example, an indication is provided to the machine monitor (QEMU in this example) indicating that aarch64 support is desired with the base machine (where different machine types can have different configurations of hardware emulated, not emulated, etc.). This indication may be provided to the hypervisor (by the orchestration engine) with the command:

qemu-system-aarch64-M virt

An example flag passed to QEMU is "-serial /dev/ttys0" to pipe the actual external serial interface to the guest one. This is one example configuration. In some embodiments, this may be multiplexed for security/access reasons. Also, in this case, the radio itself may simply bridge to the correct guest via a tap device for network access. In this case, only the guest connected to the radio would be communicating with the outside world (e.g., via Internet), so even if an attacker were to exploit that application and gain access, there would still be the hypervisor as a barrier to talk to the other guest unikernel virtual machine.

As described above, in some embodiments, a separate independent management guest virtual machine is deployed to manage other guest virtual machines running on the host ARM device. The management layer may also be used to control the virtual machines, such as in cases where controlling the virtual machines and workloads may require going through multiple layers. For example, in a classic or traditional setup for RTUs/MTUs, the master terminal (MTU) talks to a remote terminal (RTU). The master terminal also talks to an HMI (human-machine interface, such as a webpage or dashboard interface an operator is interacting with to view applicable information). The MTU acts in a manner analogous to an orchestration layer, with the RTUs being relatively simple in operation, where their task is to convert incoming digital traffic into analog signals to, for example, change settings on power systems. For example, the analog signal may be passed out from the RTU through a serial interface, communicating out through a radio. However, the end operator does not directly control the power systems (rather, the end-operator controls through the HMI to the MTU, which then communicates with the RTU, which then outputs the signal to control physical settings). This is different from typical cloud workloads that are directly addressable/accessible.

Thus, in emulating the RTU/MTU setup, the guest management virtual machine can be used to also emulate the control plane in this scenario.

In this example, the orchestration engine is configured to implement a form of access control based on the entering and exiting of different devices, by controlling that one VM guest can communicate with the Internet, but is prohibited from communicating with the physical serial interface, while it is the opposite for the other VM guest.

As described above, the diversity and variation among embedded devices can cause challenges for deploying unikernels. For example, in the case of x86 processors, there is a small number of vendors. However, with respect to ARM devices, there is a relatively much larger number of vendors that may take a core and make various design changes. Thus, one ARM device is not automatically the same as another one. In fact, devices can dramatically differ. The techniques described herein may be used to ensure that support is provided for unikernel guests on their targeted devices so that the desired functionality can be provided. In various embodiments, as described above, this includes providing customized builds, as well as determining the appropriate hypervisor orchestration configuration based on the profile of the target hardware and the services being requested.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an administration guest unikernel virtual machine run on a host device comprising an embedded processor, wherein the administration guest unikernel virtual machine is configured to:
determine hardware capabilities associated with the host device, wherein determining the hardware capabilities comprises determining hardware peripherals attached to the host device; and
based at least in part on the determined hardware capabilities associated with the host device, configure orchestration of a set of guest unikernel virtual machines to be provisioned by a hypervisor running on the host device, wherein configuring orchestration comprises:
deploying a first guest unikernel virtual machine to run a first application, wherein deploying the first guest unikernel virtual machine comprises facilitating passthrough access to a first peripheral at least in part by assigning the first peripheral to the first guest unikernel virtual machine;
deploying a second guest unikernel virtual machine to run a second application, wherein deploying the second guest unikernel virtual machine comprises facilitating passthrough access to a second peripheral different from the first peripheral at least in part by assigning the second peripheral to the second guest unikernel virtual machine; and
generating a virtualized firewall, wherein passthrough access to the first peripheral is limited to the first guest unikernel virtual machine, wherein passthrough access to the second peripheral is limited to the second guest unikernel virtual machine, and wherein access control is facilitated based at least in part on entering and exiting of different devices.

2. The system recited in claim 1, wherein a guest unikernel virtual machine is provisioned using a unikernel disk image comprising an unmodified application binary.

3. The system recited in claim 1, wherein configuring orchestration of the set of guest unikernel virtual machines comprises passing one or more flags to the hypervisor based at least in part on the determined hardware capabilities associated with the host device.

4. The system recited in claim 1, wherein based at least in part on the orchestration configuration, the first guest unikernel virtual machine is limited to passthrough access to a serial connection on the host device, and wherein the second guest unikernel virtual machine is limited to passthrough access to a radio connected to the host device.

5. The system recited in claim 1, wherein the first guest unikernel virtual machine comprises an application usable to capture images, wherein the second guest unikernel virtual machine comprises an application usable to perform image inference, and wherein based at least in part on the orchestration configuration, the first guest unikernel virtual machine is provided passthrough access to a camera attached to the host device, and wherein the second guest unikernel virtual machine is provided passthrough access to a co-processor to facilitate image inference.

6. A method, comprising:
   determining, by an administration guest unikernel virtual machine run on a host device comprising an embedded processor, hardware capabilities associated with the host device, wherein determining the hardware capabilities comprises determining hardware peripherals attached to the host device; and
   based at least in part on the determined hardware capabilities associated with the host device, configuring, by the administration guest unikernel virtual machine, orchestration of a set of guest unikernel virtual machines to be provisioned by a hypervisor running on the host device, wherein configuring orchestration comprises:
      deploying a first guest unikernel virtual machine to run a first application, wherein deploying the first guest unikernel virtual machine comprises facilitating passthrough access to a first peripheral at least in part by assigning the first peripheral to the first guest unikernel virtual machine;
      deploying a second guest unikernel virtual machine to run a second application, wherein deploying the second guest unikernel virtual machine comprises facilitating passthrough access to a second peripheral different from the first peripheral at least in part by assigning the second peripheral to the second guest unikernel virtual machine; and
      generating a virtualized firewall, wherein passthrough access to the first peripheral is limited to the first guest unikernel virtual machine, wherein passthrough access to the second peripheral is limited to the second guest unikernel virtual machine, and wherein access control is facilitated based at least in part on entering and exiting of different devices.

7. The method of claim 6, wherein a guest unikernel virtual machine is provisioned using a unikernel disk image comprising an unmodified application binary.

8. The method of claim 6, wherein configuring orchestration of the set of guest unikernel virtual machines comprises passing one or more flags to the hypervisor based at least in part on the determined hardware capabilities associated with the host device.

9. The method of claim 6, wherein based at least in part on the orchestration configuration, the first guest unikernel virtual machine is limited to passthrough access to a serial connection on the host device, and wherein the second guest unikernel virtual machine is limited to passthrough access to a radio connected to the host device.

10. The method of claim 6, wherein the first guest unikernel virtual machine comprises an application usable to capture images, wherein the second guest unikernel virtual machine comprises an application usable to perform image inference, and wherein based at least in part on the orchestration configuration, the first guest unikernel virtual machine is provided passthrough access to a camera attached to the host device, and wherein the second guest unikernel virtual machine is provided passthrough access to a co-processor to facilitate image inference.

11. A computer program product embodied in a non-transitory computer readable storage medium and comprising computer instructions for:
   determining, by an administration guest unikernel virtual machine run on a host device comprising an embedded processor, hardware capabilities associated with the host device, wherein determining the hardware capabilities comprises determining hardware peripherals attached to the host device; and
   based at least in part on the determined hardware capabilities associated with the host device, configuring, by the administration guest unikernel virtual machine, orchestration of a set of guest unikernel virtual machines to be provisioned by a hypervisor running on the host device, wherein configuring orchestration comprises:
      deploying a first guest unikernel virtual machine to run a first application, wherein deploying the first guest unikernel virtual machine comprises facilitating passthrough access to a first peripheral at least in part by assigning the first peripheral to the first guest unikernel virtual machine;
      deploying a second guest unikernel virtual machine to run a second application, wherein deploying the second guest unikernel virtual machine comprises facilitating passthrough access to a second peripheral different from the first peripheral at least in part by assigning the second peripheral to the second guest unikernel virtual machine; and
      generating a virtualized firewall, wherein passthrough access to the first peripheral is limited to the first guest unikernel virtual machine, wherein passthrough access to the second peripheral is limited to the second guest unikernel virtual machine, and wherein access control is facilitated based at least in part on entering and exiting of different devices.

* * * * *